United States Patent
Brittan et al.

(10) Patent No.: US 6,894,948 B2
(45) Date of Patent: May 17, 2005

(54) METHOD FOR PROCESSING DUAL SENSOR SEISMIC DATA TO ATTENUATE NOISE

(75) Inventors: John Brittan, Surrey (GB); Joel Gordon Starr, Richmond, TX (US)

(73) Assignee: PGS Exploration (UK) Limited, Walton-on-Thames (GB)

(*) Notice: Subject to any disclaimer, the term of this patent is extended or adjusted under 35 U.S.C. 154(b) by 137 days.

(21) Appl. No.: 10/353,293

(22) Filed: Jan. 29, 2003

(65) Prior Publication Data

US 2004/0145968 A1 Jul. 29, 2004

(51) Int. Cl.[7] .............................. G01V 1/38; G01V 1/36
(52) U.S. Cl. ........................................ 367/24; 702/17
(58) Field of Search ............................. 367/24, 21, 15, 367/73; 702/17; 703/13

(56) References Cited

U.S. PATENT DOCUMENTS

| | | | |
|---|---|---|---|
| 4,887,243 A | * 12/1989 | Pann | 367/24 |
| 5,251,183 A | * 10/1993 | McConnell et al. | 367/21 |
| 5,365,492 A | 11/1994 | Dragoset, Jr. | |
| 5,442,591 A | 8/1995 | Dragoset, Jr. et al. | |
| 5,448,531 A | * 9/1995 | Dragoset, Jr. | 367/45 |
| 5,572,483 A | 11/1996 | Chambers et al. | |
| 5,621,699 A | 4/1997 | Rigsby et al. | |
| 5,754,492 A | 5/1998 | Starr | |
| 5,825,716 A | 10/1998 | Starr | |
| 6,169,959 B1 | * 1/2001 | Dragoset, Jr. | 702/17 |
| 6,751,559 B2 | * 6/2004 | Fookes et al. | 702/17 |

FOREIGN PATENT DOCUMENTS

WO    WO 02/09742    12/2002

OTHER PUBLICATIONS

Barr et al, A Comparison of Methods for Combining Dual–Sensor Ocean Bottom Cable Traces 67th Annu. Seg Int. Mtg, Nov. 7, 1997, pp. 67–70; only abstract herewith.*
Geiser, J., Barr, F, and Paffenholz, J., "Vertical Component Coupling of OBC–Data", EAGE 64th Conference & Exhibition, May 27–30, 2002, Florence, Italy.

* cited by examiner

Primary Examiner—Ian J. Lobo
(74) Attorney, Agent, or Firm—E. Eugene Thigpen; Richard A. Fagin

(57) ABSTRACT

A method is disclosed for processing seismic data from concurrently recorded co-located pressure sensors and geophones. The seismic data are processed by first determining an upgoing wavefield and a downgoing wavefield in the seismic data. Adaptive subtraction is then applied to at least one of the upgoing wavefield and the downgoing wavefield to remove the noise from the signal. In alternative embodiments, the upgoing wavefield can be used as a noise model for the downgoing wavefield or the downgoing wavefield can be used as a noise model for the upgoing wavefield.

31 Claims, 6 Drawing Sheets

METHOD FOR PROCESSING DUAL SENSOR SEISMIC DATA TO ATTENUATE NOISE

BACKGROUND OF THE INVENTION

1. Field of the Invention

This invention relates generally to the field of geophysical prospecting. More particularly, the invention relates to the field of seismic data processing. Specifically, the invention is a method for attenuating noise in dual sensor seismic data.

2. Description of the Related Art

In the field of geophysical prospecting, the knowledge of the subsurface structure of the earth is useful for finding and extracting valuable mineral resources, such as oil and natural gas. A well-known tool of geophysical prospecting is a seismic survey. A seismic survey transmits acoustic waves emitted from appropriate energy sources into the earth and collects the reflected signals using an array of receivers. Then seismic data processing techniques are applied to the collected data to estimate the subsurface structure.

In a seismic survey, the seismic signal is generated by imparting an acoustic signal into the earth from on or near the earth's surface, which then travels downwardly into the earth's subsurface. The acoustic signal may also travel downwardly through a body of water in a marine seismic survey. Appropriate seismic energy sources used to impart the acoustic signal may include explosives or vibrators on land and air guns or marine vibrators in marine seismic surveys. When the acoustic signal encounters a seismic reflector, an interface between two subsurface strata having different acoustic impedances, a portion of the acoustic signal is reflected back to the surface, where the reflected energy is detected by a seismic receiver. Different types of seismic receivers detect and measure the amplitude of different physical aspects of the passing seismic waves.

Appropriate seismic receivers may include particle velocity detectors on land and water pressure detectors in water. Sometimes particle motion or particle acceleration detectors are used instead of particle velocity detectors. Both seismic sources and seismic receivers may be deployed individually or, more commonly, in arrays.

In intermediate zones between land and deep water, such as wet land or shallow water, both hydrophones and geophones are often used together, collocated in pairs, and positioned on the floor of the body of water. This procedure is commonly called an ocean bottom cable survey or a bay cable survey.

Dual-sensor ocean bottom seismic data often contain substantially more coherent noise than hydrophone-only seismic data. This coherent noise can be attributed to mud roll and spurious trapped or guided wave modes (sometimes referred to as torsion waves or spurious S waves). The geophone is far more sensitive to these types of coherent noise than the hydrophone. This fact has been used in some methods known in the art to attenuate noise from the geophone signal. There are, however, other types of noise contained in typical dual sensor seismic data. These types of noise include, but are not limited to, multiple reflections such as water column reverberation, transient noise, and effects due to differences in receiver coupling. There are a number of methods known in the art to attenuate such noise, using the differences between the hydrophone and geophone signals.

For example, Dragoset, Jr., W. H., in U.S. Pat. No. 5,365,492, "Method for Reverberation Suppression", issued Nov. 15, 1994, discloses a method for suppressing water-column reverberations in seismic data from dual sensor ocean bottom cable surveys. Pressure and velocity signals with embedded noise are detected concurrently from co-located dual sensors. The pressure signal is adaptively filtered and subtracted from the velocity signal to isolate a noise signature. The noise signature is added back to the velocity signal with opposite polarity to give a noise-free velocity signal. The noise-free velocity signal is multiplied by a scale factor and added to the pressure signal. The sum is auto-correlated and a function, referred to as a varimax function, is computed for the auto-correlated sum. The scale factor is incremented and the process iterated until the varimax function approaches unity. This yields the optimum scale factor for suppressing water-column reverberations.

Dragoset, Jr., W. H. and Chambers, R. E., in U.S. Pat. No. 5,442,591, "Method for Adaptively Suppressing Noise Transients in Summed Co-Sensor Seismic Recordings", issued Aug. 15, 1995, disclose a method for attenuating singular transient noise such as caused by biological sources, such as fish, in seismic data from dual sensor surveys. Pressure and velocity signals with embedded noise are detected concurrently from co-located dual sensors. The adaptive method of Dragoset's '492 patent, discussed above, is applied to scale the velocity signals to the amplitude of the pressure signals. The pressure and velocity signals are separately grouped to form common receiver gathers. The ratio $R_1$ of the amplitudes of the velocity and pressure common receiver gathers is determined. In weighting zone windows, an array of ratios $R_{2i}$ of the amplitudes of the pressure and velocity signals is determined. The ratios $R_1$ and $R_{2i}$ are multiplied to give an equalization operator $m_i$. The pressure and velocity signals are combined with the equalization operator in each weighting zone window to yield a transient noise-free time-scale datum.

Chambers, R. E., Sifton, G. A., and Paffenholz, J, in U.S. Pat. No. 5,572,483, "Method of Reducing Noise in Seismic Signals by Adaptive Filtering of a Noise Reference", issued Nov. 5, 1996, disclose a method for attenuating noise in seismic data represented as seismic traces. The suspected noise is located in a set of the seismic traces. Corresponding portions of the traces containing the noise are time-aligned and then stacked to form a stacked noise trace. The stacked noise trace is replicated at each corresponding trace position in the selected set of traces. Then the time-alignment procedure is reversed to generate noise signature traces at the original time positions. Filters are generated that minimize the difference between the noise signature traces and the original seismic traces. The noise signature traces are filtered and then subtracted from the seismic traces. The steps of generating filters, filtering and subtracting use linear adaptive filtering techniques.

Rigsby, T. B. and Sanders, J. I., in U.S. Pat. No. 5,621,699, "Apparatus and Method of Calibrating Vertical Particle Velocity Detector and Pressure Detector in a Sea-Floor Cable with In-Situ Passive Monitoring", issued Apr. 15, 1997, disclose a method for suppressing water-column reverberations in seismic data from dual sensor surveys. Geophone and hydrophone signals with embedded noise are detected concurrently from co-located dual sensors. Geophone and hydrophone noise signals that represent ambient noise for the geophone and hydrophone, respectively, are obtained. A normalized relative noise signal of the difference between the geophone and hydrophone noise signals is determined. The relative amplitudes of the geophone and hydrophone signals are scaled by a function dependent upon the normalized relative noise signal. Then the scaled signals are linearly combined.

Starr, J. G., a co-inventor of the present invention, in U.S. Pat. No. 5,754,492, "Method of Reverberation Removal from Seismic Data and Removal of Dual Sensor Coupling Errors", issued May 19, 1998, and in U.S. Pat. No. 5,825,716, "Method of Reverberation Removal from Seismic Data and Removal of Dual Sensor Coupling Errors", issued Oct. 20, 1998, discloses a method for suppressing water-column reverberations in seismic data from dual sensor surveys. The '716 patent is a division of '492 patent. An upgoing and a downgoing wavefield is determined in the seismic data. The downgoing wavefield is multiplied by the free surface reflection coefficient and then added to the upgoing wavefield.

Starr's '492 patent and '716 patent also disclose a method for attenuating the effects of receiver coupling in seismic data from dual sensor arrays. A reverberation response period is first determined. A first cross-equalization filter is constructed as a function of the reverberation response period and a second cross-equalization filter is constructed as a function of the seismic data. An inverse coupling filter is derived as a function of the first and second filters. The inverse coupling filter is then applied to the data.

Geiser, J, Barr, F., and Paffenholz, J., in their publication "Vertical Component Coupling of OBC-Data", EAGE 64th Conference & Exhibition, Florence, Italy, 27–30 May, 2002, disclose a method for attenuating vertical coupling effects in seismic data from three-component dual sensor ocean bottom cable surveys. Assuming that the hydrophone is perfectly coupled to its fluid medium, its pressure signal is used as a reference signal for the vertical component of the velocity signal from a geophone. A least squares relation between the pressure and vertical component signals is minimized to yield a correction factor for the vertical component of the velocity signal. The Geiser, et al. reference does not discuss how their method would apply, if at all, to one-component dual sensor seismic data.

SUMMARY OF THE INVENTION

One aspect of the invention is a method for processing seismic data from concurrently recorded collocated pressure sensors and particle motion sensors. The seismic data are processed by first determining an upgoing wavefield and a downgoing wavefield in the seismic data. In alternative embodiments, the upgoing wavefield can be used as a noise model for the downgoing wavefield or the downgoing wavefield can be used as a noise model for the upgoing wavefield. The noise model is used to remove noise from the other wavefield.

Another aspect of the invention is a method for seismic surveying. A method according to this aspect comprises deploying collocated hydrophones and geophones at selected positions on the bottom of a body of water, actuating a seismic energy source proximate the co-located hydrophones and geophones and recording signals detected by the hydrophones and geophones. An upgoing wavefield and a downgoing wavefield are determined from the recorded signals. Noise is removed from the at least one of the upgoing wavefield and the downgoing wavefield by using at least one of the downgoing wavefield and the upgoing wavefield as a noise model.

Other aspects and advantages of the invention will be apparent from the description and claims which follow.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION

The invention relates generally to methods for attenuating noise in seismic data collected from dual-sensor ocean bottom cable surveys. More particularly, the invention includes a method for attenuating coherent noise, such as mud roll and spurious S waves, to which the geophone is more sensitive than the hydrophone.

Figure 1:
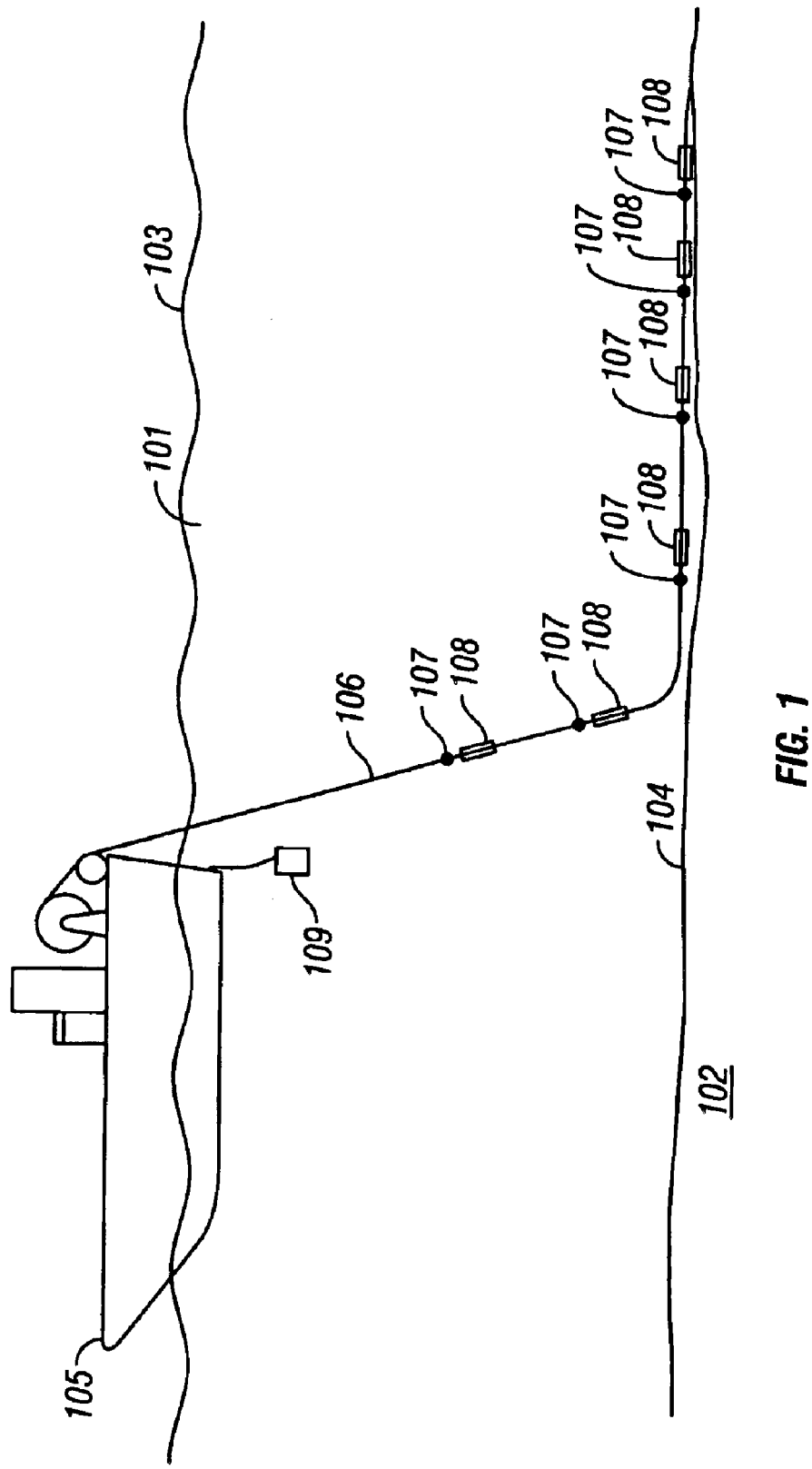
FIG. 1 shows an elevation view of a typical seismic survey using an ocean bottom cable.

FIG. 1 shows an elevation view of a typical seismic survey using an ocean bottom (or water bottom) cable. A body of water 101, which may be the ocean or a lake or the like, over a portion of the earth 102 is bounded at its surface by a water-air interface 103 and at its bottom by a water-earth interface 104. A seismic survey vessel or ship 105 in the body of water 101 positions water bottom cables 106 on the water bottom 104 (only one is shown, for simplicity). The water bottom cable 106 contains pairs of collocated dual sensors (only one pair is shown, for simplicity) spaced along its length. Each pair of sensors typically contains a hydrophone 107 and a geophone 108. The seismic source 109 may be towed by the seismic survey ship 105 or by another seismic survey ship (not shown). The seismic source 109 is towed through the body of water 101 and is actuated to emit acoustic waves at selected intervals in the vicinity of the water bottom cables 106. Signals from the pairs of sensors (hydrophone 107 and geophone 108) are recorded by equipment (not shown) usually disposed in or forming part of the water bottom cable 106. Then the water bottom cables 106 are moved to a different location, the seismic source 109 is again towed and actuated and signals are recorded. The process is repeated until the seismic survey is completed over a selected area.

Figure 2:
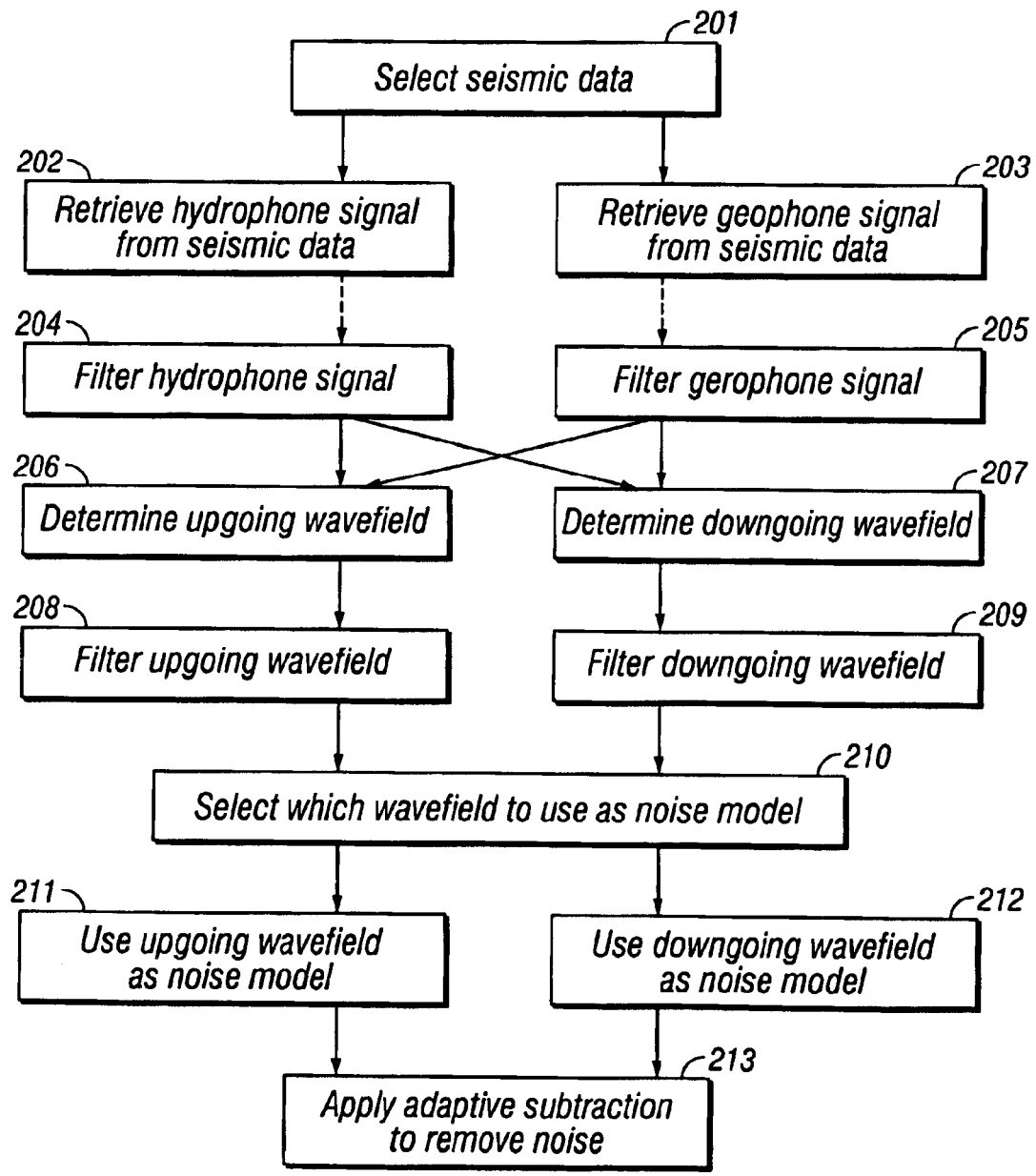
FIG. 2 shows a flowchart illustrating the processing elements of an embodiment of the method of the invention for processing seismic data.

FIG. 2 shows a flowchart illustrating the processing steps of an exemplary embodiment of the method of the invention for processing seismic data. At 201, seismic data are selected for seismic data processing. The seismic data are of the type collected from dual sensor ocean bottom cable surveys. Collocated pairs of sensors are arrayed on the water bottom in ocean cables. The pairs of sensors preferably include at least one sensor that detects water pressure, and a sensor that detects particle velocity of seismic waves passing by them. Sensors that detect water pressure and detect particle velocity are generally known in the art as hydrophones and geophones, respectively. However the invention is not limited to these two particular sensors. Other sensors including, but not limited to, detectors of particle motion or detectors of particle acceleration, may be used with appropriate simple modification of the method of the invention. For conceptual clarity only, the two sensors used to produce the dual sensor seismic data will be referred to as hydrophones and geophones.

At 202, a hydrophone signal is retrieved from the seismic data selected in step 201. Similarly, at 203, a geophone signal is retrieved from the seismic data selected in 201. The retrieved geophone signal, at 203, corresponds to the retrieved hydrophone signal, at 202. This means that the hydrophone and geophone signals retrieved at 202 and 203, respectively, were concurrently recorded from co-located hydrophones and geophones in the dual sensor seismic survey that generated the seismic data selected at 201.

Hydrophones and geophones do not mechanically respond to corresponding physical effects of pressure and velocity, respectively, from a passing seismic wave with signals of the same amplitude. Differences in signal response between geophones and hydrophones are due to different transduction constants or phone responses for different detectors determining the conversion of the detected mechanical effect into an electrical signal. Hydrophones and geophones also do not physically couple to the surrounding medium with the same efficiency. Hydrophones typically couple well to the surrounding water medium. However, geophones in an ocean bottom cable setting, typically do not couple well to the water bottom. It is generally neither feasible nor economic to manually secure the geophones to the water bottom.

Optionally, at 204 and 205, the hydrophone and geophone signals retrieved at 202 and 203, respectively, are adjusted or filtered to compensate for intrinsic differences in their response to the seismic signal, if the responses are not matched. These response differences and their corrective filters are well known in the art. These response differences include, but are not limited to, differences between hydrophones and geophones regarding their transduction, phone response, and coupling efficiency. Any such filter(s) may be applied to one or both of the hydrophone or geophone signals, as is well known in the art.

Since the geophone data contains signal plus noise and the hydrophone data contains primarily signal, a model of the noise can be obtained by comparing the geophone data and the hydrophone data.

Figure 3:
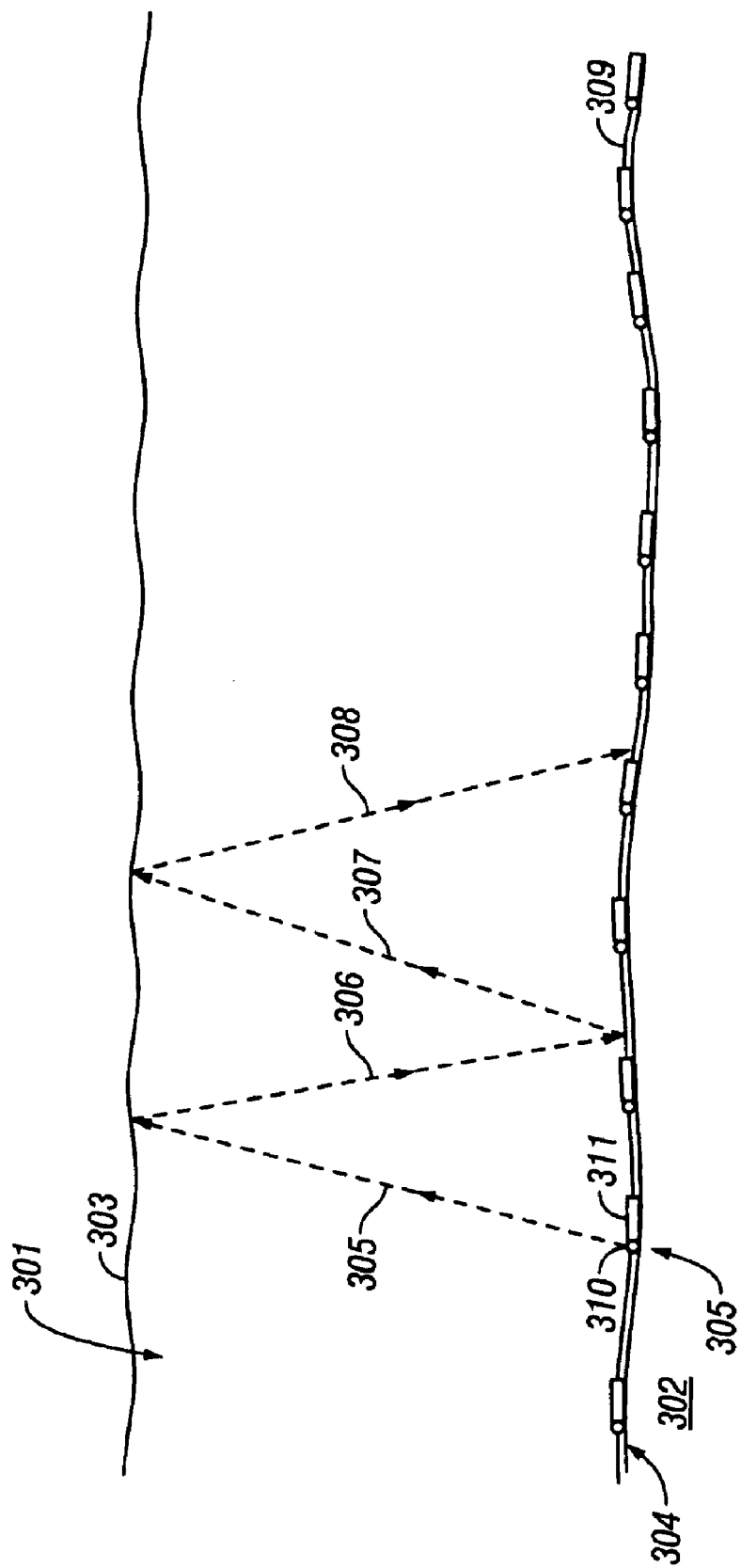
FIG. 3 shows a schematic view of upgoing and downgoing wavefields in the water column.

FIG. 3 shows a schematic view of upgoing and downgoing wavefields in the water column. A body of water 301 over the earth 302 is bounded at the water surface 303 by a water-air interface and at the water bottom 304 by a water-earth interface, both good reflectors of acoustic energy. Since the acoustic impedance difference between air and water is so great, the reflection coefficient at the water surface 303 is substantially equal to −1. The negative sign indicates a polarity reversal, that is, a 180° phase shift. The acoustic impedance difference between water and earth is not so great, so the reflection coefficient at the water bottom 304 is taken as r. The value of r (−1<r<1) depends upon the acoustic impedance of the material in the earth 302 just at and below the water bottom 304 (that is, the acoustic impedance of the sea bed). An upgoing wavefield 305, returning from at least one reflection from an interface between the underlying strata in the earth 302, enters the body of water 301 and proceeds to the water surface 303. The wavefield is partially reflected at the water surface 303 and a portion becomes a downgoing wavefield 306. The wavefield is partially reflected at the water bottom 304 and a portion again becomes an upgoing wavefield 307. Similarly, the wavefield is partially reflected at the water surface 303 and a portion again becomes a downgoing wavefield 308. This process of multiple reflections continues indefinitely.

A water bottom cable 309, positioned in the body of water 301 on the water bottom 304, contains pairs of co-located dual sensors spaced along its length. Only one water bottom cable 309 and only one pair of sensors are shown, for simplicity. Each pair of sensors typically contains a hydrophone 310 and a geophone 311. An upgoing wavefield, such as wavefield 305, passing the hydrophone 310 and geophone 311 from below, would generate electrical impulses in both sensors. This first upgoing wavefield 305 will generate a positive electrical signal in both the hydrophone 310 and geophone 311, by industry convention. When the upgoing wavefield 305 partially reflects at the water surface 303, the resultant downgoing wavefield 306 has a 180° phase reversal. Thus, the omni-directional hydrophone 310 will respond to the polarity-reversed downgoing wavefield 306 with a negative electrical signal. However, the unidirectional geophone 311 will respond to the polarity-reversed downgoing wavefield 306, now coming from above, with another positive electrical signal. The geophone 311 has again reversed the already once-reversed polarity of the signal. Therefore, the downgoing wavefield 306 generates polarity-reversed signals between the hydrophones 310 and geophones 311.

Continuing, the polarity-reversed downgoing wavefield 306 partially reflects off the water bottom 304 with no phase reversal and the resultant upgoing wavefield 307 passes a pair of hydrophones 310 and geophones 311 from below again. This time, the polarity-reversed upgoing wavefield 307 generates a negative electrical signal in the hydrophone 310 and a negative electrical signal in the geophone 311. Upon another partial reflection at the water surface 303, the resultant downgoing wavefield 308 has undergone another 180° phase reversal, back to the original polarity. Thus, the downgoing wavefield 308 will generate a positive electrical signal at the hydrophone 310 and a negative electrical signal at the geophone 311. This process of alternating electrical signals continues indefinitely. Therefore, the electrical signal generated by the hydrophone 310 continues with alternating negative and positive polarities, while the corresponding electrical signal generated by the geophone 311 continues with alternating positive and negative polarities. These differently alternating polarities have been used in the art to generate upgoing and downgoing wave fields from the hydrophone and geophone signals.

Determining the upgoing and downgoing wave fields can be done by any technique known in the art of seismic processing. A non-limiting example will shown here. Following the analysis in columns 3 and 4 of Starr, U.S. Pat. No. 5,754,492, discussed in the Background section herein, the relative polarity and amplitude of the P-wave for any given point in time is determined by the product of the reflection coefficients for each successive reflection between the water surface and the water bottom.

For seismic detectors located on the water bottom 304, the pressure response P and the particle velocity response V can be expressed as functions of the variable Z.

$$Z = e^{i\omega\tau},$$

where e is the Euler number representing the exponential function, i is the imaginary unit $\sqrt{-1}$, ω is the frequency, and is the two-way travel time through the body of water 301. The two-way travel time can be calculated by the expression:

$$\tau = \frac{2d}{v\cos\theta},$$

where d is the vertical water depth, v is the velocity of seismic energy in the water, and θ is the angle of incidence. Then the pressure response, P(Z), in terms of Z, is given by the equation:

$$P(Z)=Z^0+(1+r)Z^1-r(1+r)Z^2+r^2(1+r)Z^3-\ldots+\ldots, \quad (1)$$

where r is the reflection coefficient of the water bottom. Similarly to Equation (1), the particle velocity response, V(Z), in terms of Z, is given by the equation:

$$\frac{\alpha}{\cos\theta}V(Z) = Z^0 - (1-r)Z^1 + r(1-r)Z^2 - r^2(1-r)Z^3 + \ldots = \ldots \quad (2)$$

where α is the acoustic impedance.

Calculating the closed forms of Equations (1) and (2) yields the expressions:

$$P(Z) = 1 + \frac{(1-r)Z}{1+rZ} = \frac{1+Z}{1+rZ} \quad (3)$$

and $$\frac{\alpha}{\cos\theta}V(Z) = 1 - \frac{(1+r)Z}{1+rZ} = \frac{1-Z}{1+rZ}. \quad (4)$$

Returning to FIG. 2, at 206, an upgoing wavefield is determined in the seismic data. Determining the upgoing wavefield preferably comprises combining the hydrophone and geophone signal retrieved at 202 and 203, respectively. In particular, combining the hydrophone and geophone data preferably comprises adding the hydrophone and geophone signals.

The upgoing vector wavefield, U(Z), is preferably determined by adding Equations (3) and (4), which gives the following expression:

$$U(Z) = \frac{1}{2}\left[\frac{\alpha}{\cos\theta}V(Z) + P(Z)\right] = \frac{1}{2}\left[\frac{1+Z}{1+rZ} + \frac{1-Z}{1+rZ}\right] = \frac{1}{1+rZ}. \quad (5)$$

At 207, a downgoing wavefield is similarly determined from the seismic data. Determining the downgoing wavefield preferably comprises combining the hydrophone and geophone data retrieved at 202 and 203, respectively, to generate a downgoing wavefield. In particular, combining the hydrophone and geophone data preferably comprises subtracting the hydrophone data from the geophone data.

The polarity reversed downgoing vector wavefield, D(Z), is preferably determined by subtracting Equation (3) from Equation (4), which gives the following expression:

$$D(Z) = \frac{1}{2}\left[\frac{\alpha}{\cos\theta}V(Z) + P(Z)\right] = \frac{1}{2}\left[\frac{1+Z}{1+rZ} - \frac{1-Z}{1+rZ}\right] = \frac{Z}{1+rZ}. \quad (6)$$

Once the upgoing and downgoing wavefields are determined, at 206 and 207, respectively, the signal in the upgoing and the downgoing wavefields will be separated by a linear phase shift, but the noise is similar in the two wavefields. The downgoing wavefield can therefore be used as a noise model for the upgoing wavefield. Similarly, the upgoing wavefield can be used as a noise model for the downgoing wavefield. Adaptive subtraction can then be used, in one embodiment, to remove the noise from the geophone data.

At 208, the upgoing wavefield generated at 206 is bandpass filtered to retain only the lower portion of the frequency spectrum. As a practical matter, the noise being removed is generally limited to the lower portion of the frequency spectrum. Thus, the noise model (either the upgoing or downgoing wavefield determined at 206 and 207, respectively) is typically filtered to retain only the frequency passband of the noise. Typically, this lower portion of the spectrum might comprise the frequencies less than about 20 Hz, but the invention is not limited to this passband. Similarly, at 209, the downgoing wavefield generated at 207 is bandpass filtered to retain only the lower portion of the frequency spectrum. Again, the lower portion typically might comprise the frequencies less than about 20 Hz, but the invention is not limited to this passband.

At 210, one of the upgoing or downgoing wavefields filtered at 208 and 209, respectively, is selected to use as a noise model for the other wavefield, the other wavefield being the downgoing or upgoing wavefield. The other wavefield will then be referred to as the "input signal." If the bandpass-filtered upgoing wavefield is used as the noise model and the downgoing wavefield is used as the "input signal", then the process continues as shown at 211. Alternatively, if the bandpass-filtered downgoing wavefield is used as the noise model, and the upgoing wavefield is used as the "input signal", then the process continues as shown at 212.

At 213, the noise and signal energy in the selected "input signal" are separated by adaptive subtraction of the noise model, as determined at 211 or 212 from the particular "input signal" selected at 210. In adaptive subtraction, a set of filters f(t) is designed, based on a selected window size and filter length, that when convolved with the "noise model" minimizes the total energy in an "output signal." "Output signal" as used herein means the noise model (whether upgoing or downgoing wavefield after bandpass filtering) convolved with the filters f(t), the convolution being subtracted from the "input signal", (the other of the upgoing or downgoing wavefield), or as shown in the following expression:

$$\text{output signal} = \text{input signal} - (f(t)*\text{noise model})l \quad (7)$$

In embodiments of a method according to the invention, the "input signal" and the noise model data sets are each split up into separate windows. The windows may each have user specified time and space window lengths. Preferably the windows overlap each other in both the time and space directions by about 50 percent of the window length in the time and/or space direction. Thus each time sample (apart from at the top, bottom, left hand, and right hand edges of a trace gather) will be copied into four windows. Then, in some embodiments, in each window a cosine-squared taper is applied to the samples from the center of the gather (a) upward and downward (in the time direction) and (b) leftward and rightward (i.e. in the positive x direction).

The total energy E of the output signal will be minimized, in a least-squares sense, when the filters f(t) are properly determined. The total energy E in each window is defined as:

$$E = \sum_i^m \sum_j^n \text{output\_signal}\,[(i-1)\Delta t, (j-1)\Delta x]^2, \quad (8)$$

where each window contains m samples in time and n samples in space. The optimum filters f(t) are temporal convolution filters that may vary from window to window. If any data window in either the noise model or the input signal is entirely composed of zeroes then the adaptive subtraction will not operate on that window and the output signal will be equivalent to the input signal in that window.

The least-square filter determination is done on a window-by-window basis with the results independent from window to window. Thus, the overlapping sections are copied out multiple times, multiply filtered and then summed together at the end. In this embodiment, the filters for each window are least-square Wiener filters, which are calculated in a conventional manner using the Wiener-Levinson algorithm.

When the filters f(t) are determined and the energy in each window is minimized, the output signal represents an upgoing or downgoing wavefield having minimum coherent noise.

Figure 4:
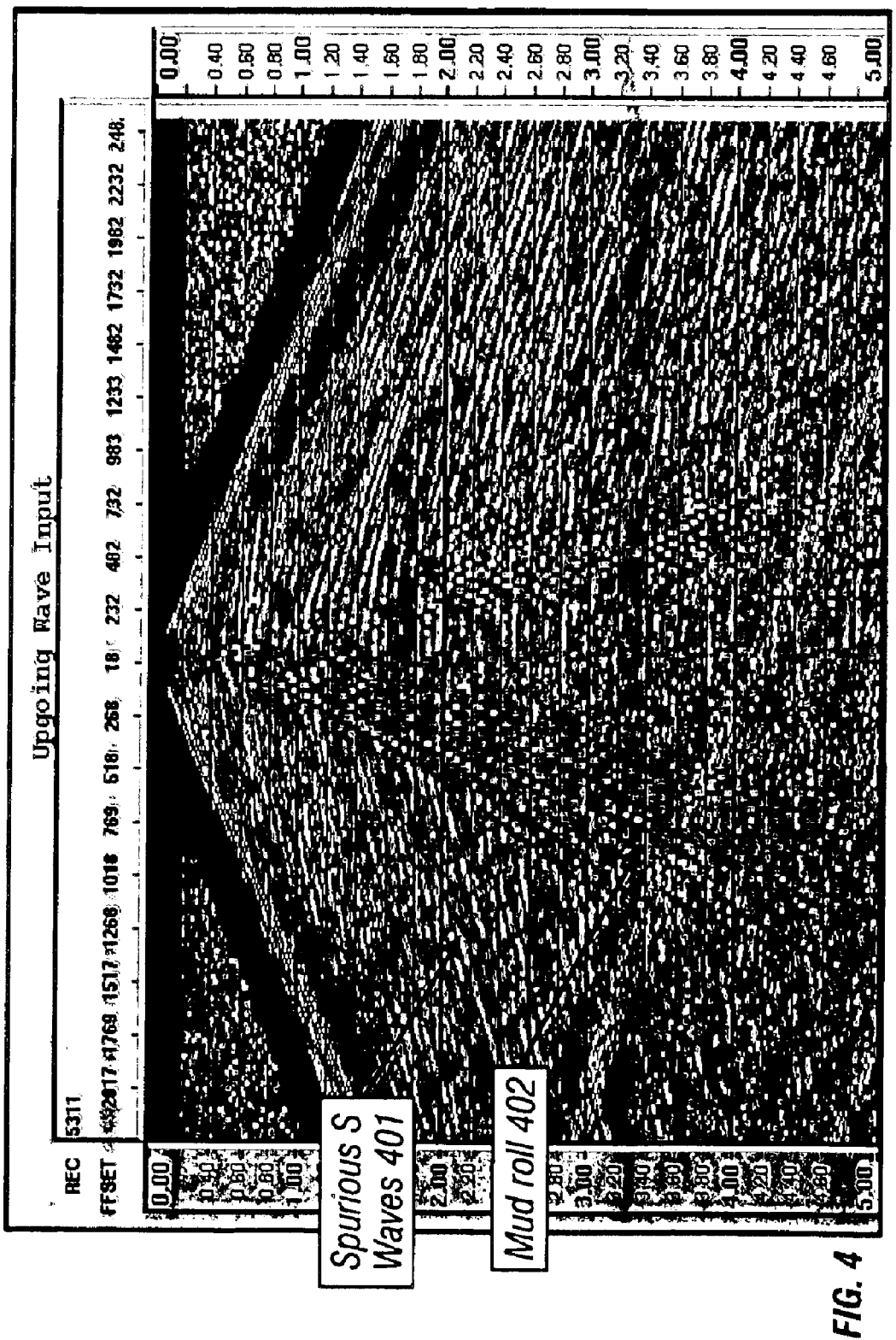
FIG. 4 shows the recorded seismic signal of an example upgoing wavefield.
Figure 5:
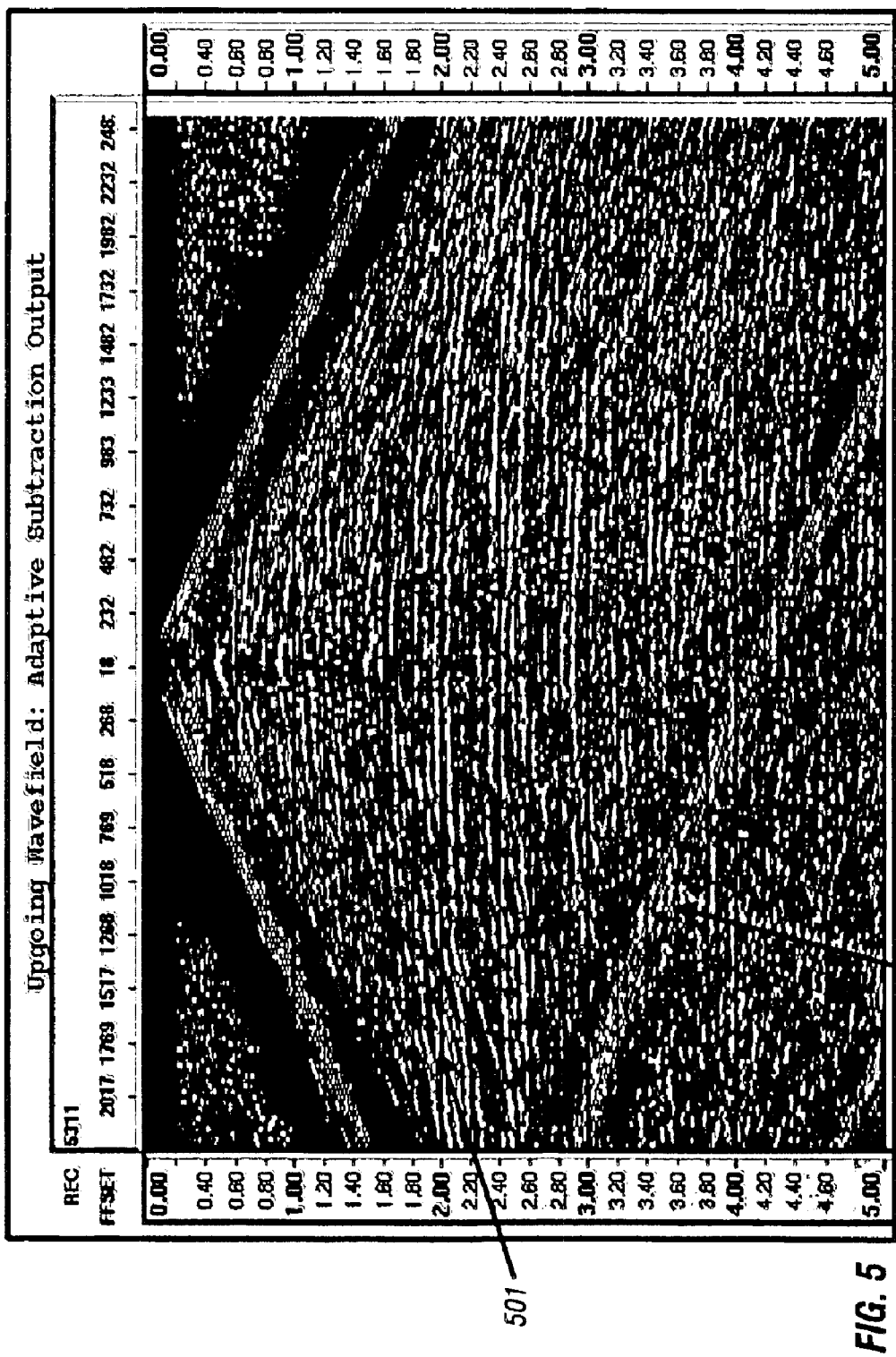
FIG. 5 shows the upgoing wavefield from FIG. 4 after application of the method of the invention.
Figure 6:
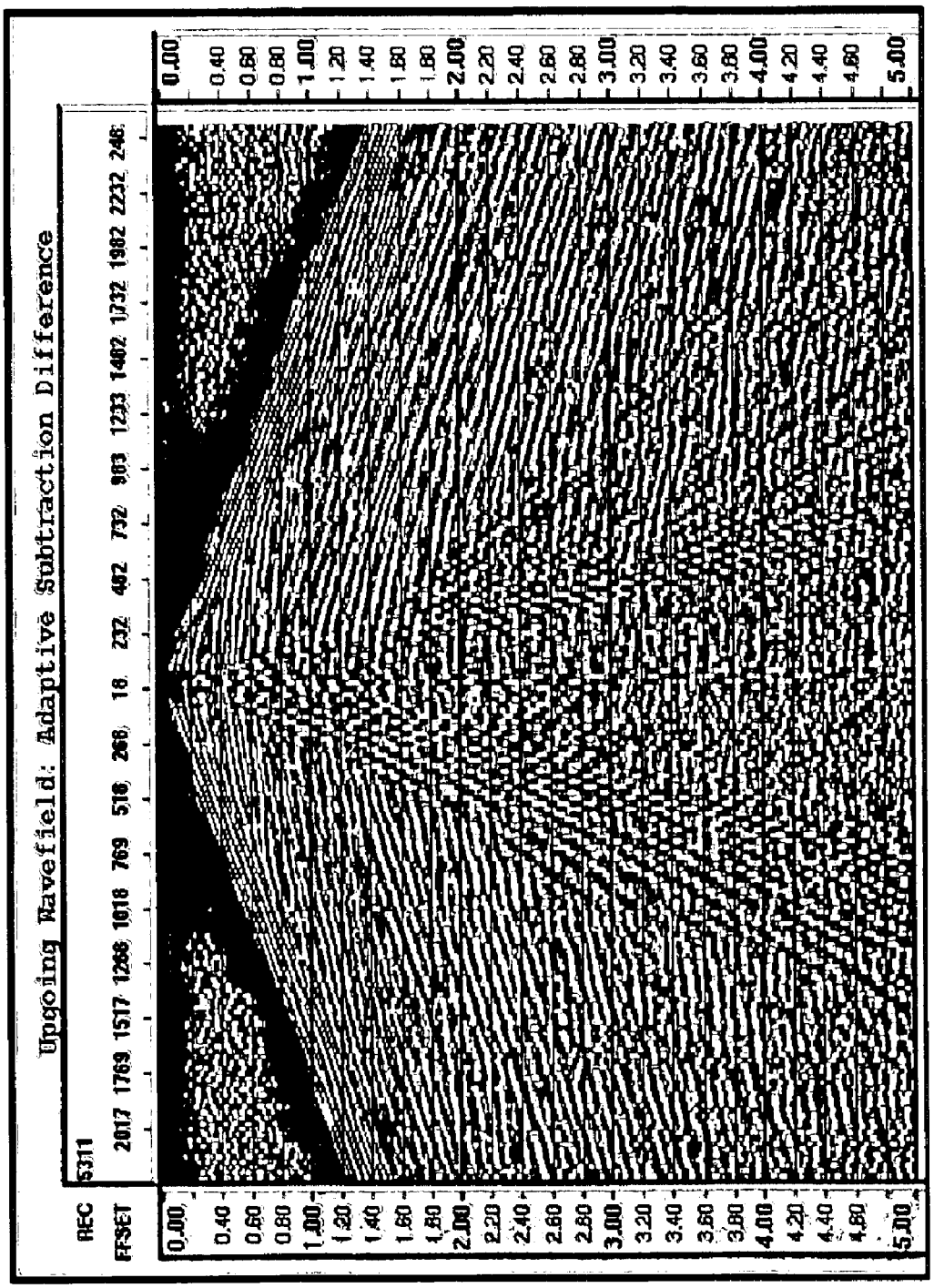
FIG. 6 shows the difference between FIGS. 4 and 5.

FIG. 4 shows the recorded seismic signal of an example upgoing wavefield. The seismic signal includes examples of coherent noise caused by spurious S waves 401 and mud roll 402. FIG. 5 shows the upgoing wavefield from FIG. 4 after application of the method of the invention. The effects of the coherent noise in FIG. 4 have been substantially eliminated at 501 and 502. FIG. 6 shows the difference between FIGS. 4 and 5.

Embodiments of a method according to the invention can improve interpretation of dual-sensor water bottom cable seismic surveys by reducing the amount of coherent noise present in the data from sources such as mud roll and spurious S waves.

It should be understood that the preceding is merely a description of specific embodiments of this invention and that numerous changes, modifications, and alternatives to the disclosed embodiments can be made in accordance with the foregoing description without departing from the scope of the invention. The preceding description, therefore, is not meant to limit the scope of the invention. Rather, the scope of the invention is to be determined only by the appended claims and their equivalents.

What is claimed is:

1. A method for processing seismic data from concurrently recorded collocated pressure sensors and particle motion sensors, comprising:

determining an upgoing wavefield from the seismic data;

determining a downgoing wavefield from the seismic data; and removing noise from the at least one of the upgoing wavefield and the downgoing wavefield by using the other one of the downgoing wavefield and the upgoing wavefield as a noise model.

2. The method of claim 1, wherein determining the upgoing wavefield comprises:

retrieving pressure and particle motion signals from the seismic data; and combining the pressure and particle motion signals.

3. The method of claim 2, wherein combining the pressure sensor and particle motion sensor signals comprises adding the pressure sensor and particle motion sensor signals.

4. The method of claim 1, wherein determining the downgoing wavefield comprises: retrieving pressure sensor and particle motion sensor signals from the seismic data; and combining the pressure sensor and particle motion sensor signals.

5. The method of claim 4, wherein combining the pressure sensor and particle motion sensor signals comprises subtracting the pressure sensor signal from the particle motion sensor signal.

6. The method of claim 1, further comprising filtering the seismic data to compensate for a transduction difference between the pressure sensors and the particle motion sensors.

7. The method of claim 1, further comprising filtering the seismic data to compensate for phone response difference between the pressure sensors and the particle motion sensors.

8. The method of claim 1, further comprising filtering the seismic data to compensate for coupling efficiency difference between the pressure sensors and the particle motion sensors.

9. The method of claim 1, further comprising filtering the noise model to contain only the frequency pass band of the noise.

10. The method of claim 9 wherein the frequency pass band of the noise has an upper limit of at most about 20 Hz.

11. The method of claim 1, wherein removing the noise comprises adaptively subtracting the noise model from the at least one of the upgoing and downgoing wavefields.

12. The method of claim 11 wherein the adaptive subtracting comprises:

splitting the noise model and the at least one of the upgoing and downgoing wavefields into separate windows, the windows having preselected time and space window lengths, the windows having a 50 percent overlap in both time and space directions;

applying a cosine-squared taper to samples from the center of a trace gather upward, leftward and rightward.

13. The method of claim 11, wherein the adaptively subtracting substantially removes noise from the upgoing wavefield.

14. The method of claim 11, wherein the adaptively subtracting substantially removes noise from the downgoing wavefield.

15. The method of claim 1 wherein the pressure sensors comprise hydrophones.

16. The method of claim 1 wherein the particle motion sensors comprise geophones.

17. The method of claim 1 wherein the particle motion sensors comprise acceleration sensors.

18. A method for seismic surveying, comprising:

deploying co-located hydrophones and geophones at selected positions on the bottom of a body of water;

actuating a seismic energy source proximate the collocated hydrophones and geophones;

recording signals detected by the hydrophones and geophones;

determining an upgoing wavefield from the recorded signals;

determining a downgoing wavefield from the recorded signals; and removing noise from the at least one of the upgoing wavefield and the downgoing wavefield by using the other one of the downgoing wavefield and the upgoing wavefield as a noise model.

19. The method of claim 18, wherein determining the upgoing wavefield comprises combining the hydrophone and geophone signals.

20. The method of claim 19, wherein combining the hydrophone and geophone signals comprises adding the hydrophone and geophone signals.

21. The method of claim 18, wherein determining the downgoing wavefield comprises combining the hydrophone and geophone signals.

22. The method of claim 18, wherein combining the hydrophone and geophone signals comprises subtracting the hydrophone signal from the geophone signal.

23. The method of claim 18, further comprising filtering the recorded signals to compensate for a transduction difference between the hydrophones and the geophones.

24. The method of claim 18, further comprising filtering the recorded signals to compensate for phone response difference between the hydrophones and the geophones.

25. The method of claim 18, further comprising filtering the recorded signals to compensate for coupling efficiency difference between the hydrophones and the geophones.

26. The method of claim 18, further comprising filtering the noise model to contain only the frequency pass band of the noise.

27. The method of claim 26 wherein the frequency pass band of the noise has an upper limit of at most about 20 Hz.

28. The method of claim 18, wherein removing the noise comprises adaptively subtracting the noise model from the at least one of the upgoing and downgoing wavefields.

29. The method of claim 28, wherein the adaptively subtracting substantially removes noise from the upgoing wavefield.

30. The method of claim 28, wherein the adaptively subtracting substantially removes noise from the downgoing wavefield.

31. The method of claim 28 wherein the adaptively subtracting comprises:
   splitting the noise model and the at least one of the upgoing and downgoing wavefields into separate windows, the windows having preselected time and space window lengths, the windows having a 50 percent overlap in both time and space directions;
   applying a cosine-squared taper to samples from the center of a trace gather upward, leftward and rightward.

* * * * *